United States Patent
Srivastava et al.

[19]

[11] Patent Number: 6,051,518
[45] Date of Patent: Apr. 18, 2000

[54] MICROBIAL PROCESS AND COMPOSITION FOR THE REGENERATION OF CATALYSTS

[75] Inventors: Kailash Chandra Srivastava, Centreville; Daman S. Walia, Clifton, both of Va.

[73] Assignee: Gas Research Institute, Chicago, Ill.

[21] Appl. No.: 08/936,664

[22] Filed: Sep. 24, 1997

Related U.S. Application Data

[60] Provisional application No. 60/026,794, Sep. 27, 1996.

[51] Int. Cl.$^7$ .................................................... B01J 20/34
[52] U.S. Cl. ................................ 502/20; 502/22; 502/38; 435/262; 435/282
[58] Field of Search ................................ 502/20, 22, 38; 435/262, 282

[56] References Cited

U.S. PATENT DOCUMENTS

| | | | |
|---|---|---|---|
| 3,414,524 | 12/1968 | Abson | 252/410 |
| 4,559,313 | 12/1985 | Myerson et al. | 502/25 |
| 4,632,906 | 12/1986 | Kopacz | 435/282 |
| 4,775,627 | 10/1988 | Attia et al. | 435/262 |
| 4,880,740 | 11/1989 | Hoffmann et al. | 435/168 |
| 5,002,888 | 3/1991 | Kilbane, II | 435/252.31 |
| 5,094,688 | 3/1992 | Eckstein et al. | 106/21 |
| 5,104,801 | 4/1992 | Kilbane, II | 435/282 |
| 5,132,219 | 7/1992 | Kilbane, II | 435/195 |
| 5,196,129 | 3/1993 | Luisi | 252/49.5 |
| 5,198,341 | 3/1993 | Kilbane, II | 435/42 |
| 5,244,493 | 9/1993 | Brierley et al. | 75/743 |
| 5,250,483 | 10/1993 | Sperl et al. | 502/7 |
| 5,316,751 | 5/1994 | Kingsley et al. | 423/571 |
| 5,332,559 | 7/1994 | Brierley et al. | 423/27 |
| 5,344,778 | 9/1994 | Kilbane, II | 435/262 |
| 5,352,600 | 10/1994 | Gelfand et al. | 435/194 |
| 5,358,869 | 10/1994 | Kilbane, II | 435/282 |
| 5,508,014 | 4/1996 | Rai | 423/224 |

OTHER PUBLICATIONS

W. John Ingledew: *Ferrous Iron Oxidation By Thiobacillus ferrooxidans,* Department of Biochemistry and Microbiology, University of St. Andrews, St. Andrews, U.K., Biotechnology and Bioengineering Symposium No. 16 (1986), no month.

Dennis A. Dalrymple, Timothy W. Trofe, James M. Evans: *An Overview of Liquid Redox Sulfur Recovery,* Chemical Engineering Progress, pp. 43–49 (Mar. 1989).

Suzuki, Isamu et al.: *Ferrous Iron and Sulfur Oxidation and Ferric Iron Reduction Activities of Thiobacillus ferrooxidans Are Affected by Growth on Ferrous Iron, Sulfur, or a Sulfide Ore,* Applied and Environmental Microbiology, pp. 1620–1626, Jun. (1990).

Shrihari, R. Kumar and K.S. Gandhi: *Modelling of $Fe^{2+}$ oxidation by Thiobacillus ferrooxidans,* Applied Microbiology and Microbiology Biotechnology, 33:524–528 (1990), no month.

P.N. Agumado and Charanjit Rai: *Microbial Sweetening of Sour Gas,* presented at 1991 GRI Liquid Redox Sulfur Recovery Conference, Austin, Texas, May 5–7, 1991.

Hans T. Karlsson, et al., *Swedish Activities on Microbial Desulfurization of Coal,* Third Symposium on Biotechnology of Coal and Coal–Derived Substances, Essen, Germany, Sep. 23–24, 1991.

Russ K. Kwan and Alan M.Childs: *Technical and Economic Comparison of Two Liquid Redox Processes: LoCat and SulFerox,* presented at 1991 GRI Liquid Redox Sulfur Recovery Conference, Austin, Texas, May 5–7, 1991.

*Primary Examiner*—John F. Niebling
*Assistant Examiner*—Alexander G. Ghyka
*Attorney, Agent, or Firm*—Pauley Peterson Kinne & Fejer

[57] ABSTRACT

The present invention relates to a biological process for regenerating metal-containing sulfide mitigation catalysts that are commonly known in the natural gas processing industry as liquid redox catalysts. The invention further relates to a sulfide mitigation process wherein mitigation and regeneration are performed in a single reactor under substantially anaerobic conditions. The present invention also relates to a self regenerating catalyst composition for the mitigation of sulfides.

3 Claims, 13 Drawing Sheets

THE REGENERATION OF ARI–LO–CAT CATALYST AS A FUNCTION OF REDOX POTENTIAL BY *SULFOLOBUS ACIDOCALDARIUS* DESA-1 AT 70°C AND 25°C

FIG.1 PROCESS FLOW DIAGRAM OF ARI-LO-CAT II CONFIGURATION (PRIOR ART)

EXPERIMENTAL SET-UP FOR THE 2L AND 14L REACTORS

PROCESS FLOW DIAGRAM FOR BIOREGENERATION OF ARI-LO-CAT II CATALYST AND THE DOWNSTREAM PROCESSING

THE REGENERATION OF ARI-LO-CAT II CATALYST AS A FUNCTION OF REDOX POTENTIAL BY *THIOBACILLUS FERROOXIDANS* AND ARCTECH's SS II IN COMPARISON TO CONTROL

THE REGENERATION OF ARI-LO-CAT CATALYST AS A FUNCTION OF REDOX POTENTIAL BY *ACIDIANUS BRIERLEYI* AT 25°C

THE REGENERATION OF ARI-LO-CAT CATALYST AS A FUNCTION OF REDOX POTENTIAL BY *SULFOLOBUS ACIDOCALDARIUS* DESA-1 AT 70°C AND 25°C

THE RATE OF OXIDATION OF REDUCED ARI-LO-CAT BY *SULFOLOBUS ACIDOCALDARIUS* DESA-1 AT DIFFERENT pH AND 25°C

THE RATE OF OXIDATION OF REDUCED ARI-LO-CAT BY
SULFOLOBUS ACIDOCALDARIUS DESA-1 AT DIFFERENT pH AND AT 40°C

THE RATE OF OXIDATION OF REDUCED ARI-LO-CAT BY *THIOBACILLUS FERROOXIDANS* AT DIFFERENT pH AND AT 25°C

H2S REMOVAL BY THE ARI-LO-CAT REGENERATED BY *SULFOLOBUS ACIDOCALDARIUS* DESA-1

H₂S REMOVAL BY THE ARI-LO-CAT REGENERATED BY *THIOBACILLUS FERROOXIDANS*

MICROBIAL PROCESS AND COMPOSITION FOR THE REGENERATION OF CATALYSTS

This application claims priority from provisional application Ser. No. 60/026,794, filed Sep. 27, 1996, entitled "Microbial Process and Composition for the Regeneration of Catalysts." That application is incorporated herein by reference in its entirety.

FIELD OF THE INVENTION

The present invention relates to a process for regenerating sulfide mitigation catalysts, which are also commonly known in the natural gas processing industry as liquid redox catalysts. The invention also relates to a self-regenerating catalyst composition for mitigating sulfides. Further, the invention relates to a process of treating a sour natural gas to reduce its sulfur content. More particularly, the present invention relates to the microbiological oxidation under anaerobic, aerobic or microaerophilic conditions of ferric chelates reduced during the treatment of sour natural gas as a result of the removal of $H_2S$ and other sulfur species, such as carbon disulfide, methyl mercaptan, ethyl mercaptan and dimethyl sulfide, from a natural gas stream.

BACKGROUND OF THE INVENTION

Natural gas reserves often contain hydrogen sulfide ($H_2S$) as a major contaminant. Hydrogen sulfide is an acid gas that is toxic and corrosive in the presence of water. A significant portion of total gas production does not meet pipeline standards and needs treatment to reduce the $H_2S$ concentration to ¼ grain per 100 standard cubic feet (about 4 to 6 mg/L), or $\leq 4$ ppm on a volume basis.

A commonly used commercial process for the removal of $H_2S$ from the gas stream is the Amine process, followed by the Claus process for sulfur recovery. In the Amine process, the gas stream is contacted with the amine solvent to remove $H_2S$, then the amine solvent is heated to 194–302° F. (90–150° C.) to liberate $H_2S$ and regenerate the solvent, which is recycled. Although the $H_2S$ is removed from the sour natural gas stream, it still must be disposed of. Hydrogen sulfide generated during regeneration of the amine solvent can either be incinerated, which converts the hydrogen sulfide disposal problem into an air pollution problem due to the production of $SO_2$, or treated by physicochemical methods such as the Claus process. In the Claus process, $H_2S$ is fed into a reaction furnace, and the reaction gas is passed through a series of catalytic reactors to convert the $H_2S$ into elemental sulfur. Although the Claus process produces a high quality elemental sulfur product, the process is often too expensive for small capacity plants, which are those having a capacity of less than 2 MMSCFD (million standard cubic feet per day) (about 56.6 million liters per day).

An alternative to the Amine/Claus process is liquid redox technology in which catalysts, including without limitation iron and vanadium catalysts, act as oxidizing agents in the mitigation of sulfides. Over the past three decades, liquid redox processes have been used in combination with sulfur mitigation and recovery processes for the treatment of a variety of sour gas streams. Many of these processes are described in "An Overview of Liquid Redox Sulfur Recovery", *Chemical Engineering Progress*, May 1989, pp 43–49, which is hereby incorporated by reference. In the sulfur mitigation and recovery processes, a sulfide mitigation catalyst is employed to oxidize sulfide compounds, thereby enabling removal of sulfide from the gas stream and eventual recovery of elemental sulfur. Liquid redox processes are better able to handle larger quantities of gases (up to 30 MMSCFD) (about 840 million liters per day).

However, the use of liquid redox processes has been limited and discouraged by high costs and the difficulty of regenerating sulfide mitigation catalysts which are used and reduced during such processes. These catalysts act as oxidizing agents upon sulfides such as $H_2S$ and as a result are reduced themselves. For example, when ferric catalysts are used, the catalyst will typically be reduced during the liquid redox process from ferric to ferrous form as a result of the oxidation of sulfides. In order to be useful again, the sulfide mitigation catalyst must be regenerated by oxidation of its metal species.

Several liquid redox processes are available; among the most prominent are Stretford, Sulfolin, Sulferox®, and the Wheelabrator Clean Air Systems-ARI-LO-CAT System®. The Stretford and Sulfolin processes use vanadium as the active metal for the redox reaction and as a result, vanadium is present in the recovered sulfur. Environmental restrictions make disposal of the vanadium tainted sulfur a major problem.

In several existing liquid redox systems, sour natural gas (natural gas mixed with one or more sulfide gases) contacts a ferric chelate compound in a mitigation reactor. In the mitigation reactor, the sulfide is oxidized by the ferric chelate and ultimately converted to elemental sulfur by the chemical process set forth in Equation 1:

$$H_2S + 2Fe^{3+} \rightarrow S + 2H^+ + 2Fe^{2+} \quad \text{(Equation 1)}$$

The ferric chelate compound, which has been reduced to ferrous form, is then removed to a regeneration chamber where it is regenerated.

One known method of regeneration is through aeration, or contacting the catalyst with air containing oxygen. Regeneration is accomplished by aeration in the chemical process set forth in Equation 2:

$$\tfrac{1}{2}O_2 + 2Fe^{2+} + 2H^+ \rightarrow 2Fe^{3+} + H_2O \quad \text{(Equation 2)}$$

The net reaction from mitigation and regeneration, combining Equations 1 and 2, is set forth below in Equation 3:

$$H_2S + \tfrac{1}{2}O_2 \rightarrow S + H_2O \quad \text{(Equation 3)}$$

The spent catalyst is oxidized by the oxygen-containing air contacting the process solution which contains the catalyst. After regeneration, the catalyst is returned to the mitigation reactor for another turn in the mitigation of sulfide. These processes require a regeneration reactor which is separate from the mitigation reactor and thereby entail significant capital expense for a second reactor. Additional expenses associated with the regeneration reactor arise from the risk of explosion during the aeration procedure. Therefore, further additional capital expenditures and operating costs are required to minimize this risk of explosion.

Another possibility for regeneration is through the use of microorganisms which are capable of oxidizing the sulfide mitigation catalyst. In one process, which is the basis for a process known as Bio-SR, the ferrous sulfate formed during $H_2S$ oxidation in accordance with Equation 4 is converted to ferric sulfate by the bacterium *Thiobacillus ferrooxidans* in accordance with Equation 5.

$$H_2S + Fe_2(SO_4)_3 \rightarrow FeSO_4 + H_2SO_4 + S \quad \text{(Equation 4)}$$

$$2FeSO_4 + H_2SO_4 + \tfrac{1}{2}O_2 \rightarrow Fe_2(SO_4)_3 + H_2O \quad \text{(Equation 5)}$$

In the Bio-SR method, regeneration occurs in a reactor separate from the one where sulfide is mitigated from sour natural gas.

Studies conducted at Texas A & M University show that reduced ARI LO-CAT II® catalyst (a ferric chelate sold by ARI as a sulfide mitigation catalyst) can be regenerated by biological treatment with *Thiobacillus ferrooxidans* in the presence of air. One advantage of this method is that the regeneration of the catalyst can occur in the same reactor as does the mitigation of sulfides by the catalyst. However, the utility of *Thiobacillus ferrooxidans* for regeneration at temperatures of 40° C. (104° F.) and higher is in question because of the maximum growth temperature for *T. ferrooxidans*. Highly thermophilic organisms are those which grow and thrive in temperatures above 40° C.

In contrast, *T. ferrooxidans* grows in the temperature range of about 10° C. to about 37° C. (about 50° F. to about 99° F.). Little or no growth is seen at temperatures of 42° C. (about 108° F.) and above. Regeneration at higher temperatures is desirable because sour natural gas is generally introduced to reactors at higher temperatures, for example at 46° C. (about 115° F.), and mitigation of sulfide generally occurs at higher temperatures as well. Also, liquid redox plants often need to run sulfide mitigation reactors at temperatures up to 80° C. (about 176° F.) in order to evaporate water formed as a result of converting hydrogen sulfide to sulfur. One problem with the use of *T. ferrooxidans* to regenerate ARI LO-CAT II® catalyst is that an operator must frequently adjust the temperature of the reactor to a lower temperature to allow for the regeneration of the catalyst and the growth of the *T. ferrooxidans* microorganism.

Another disadvantage associated with the use of the *T. ferrooxidans* in the LO-CAT system is that *T. ferrooxidans* has generally been used as part of an aerobic regeneration process. Thus, many of the disadvantages previously mentioned in describing aerobic regeneration are applicable to the present use of *T. ferrooxidans*.

The LO-CAT process as generally practiced heretofore is shown schematically in FIG. 1. Sour natural gas or other gas to be desulfurized, such as landfill gas, geothermal gas, vent gas, biogas, or the like which contains sulfur species, passes from a sour natural gas source 20 through a coalescing filter 22 for removal of liquid droplets. The sour natural gas is then sparged into the reactor 24 through a sparger 26 and bubbled into the process solution 28 which may contain *Thiobacillus ferrooxidans* as a mitigation catalyst. The treated gas bubbles out of the process solution 28 and proceeds out of the reactor 24 through an exit conduit 30 to storage or a pipeline.

An air blower 32 supplies sufficient air to the reactor 24 to oxidize the reduced catalyst in a catalytic process and sour natural gas in an aeration process. Spent air, diminished in or without oxidizing capacity, is removed from the reactor 24 via the exit conduit 30.

Precipitated sulfur accumulates at the bottom cone 36 of the reactor 24. A filter feed pump 38 delivers sulfur slurry from the cone 36 to a belt filter 40. At the belt filter 40, wash water is sprayed on the filter cake to remove as much process liquid as possible, which is returned to the reactor 24. Sulfur filter cake is removed from the belt filter 40 to a reslurry vessel 42 where water is added to bring the percent of solids to about 20%. A slurry pump 44 may be employed to pump the sulfur slurry to the sulfur separator 46 where sulfur is separated from liquids. From the sulfur separator 46 the slurry passes to a sulfur filter 48 which separates smaller sulfur particles from liquids. Molten sulfur advances to the molten sulfur storage container 50 and the liquids recirculate to the reactor 24. A sulfur loading pump 52 may also be provided.

SUMMARY OF THE INVENTION

An object of the invention is to provide a method for regenerating sulfide mitigation catalysts which has improved oxidation kinetics over existing methods.

Another object of the present invention is to provide a method of treating sour natural gas and regenerating catalysts under anaerobic conditions in a single reactor.

A further object of the present invention is to provide a low cost, economical and efficient process for the regeneration of catalysts reduced by removal of $H_2S$ and other sulfides from sour natural gas.

At least one of these and other objects are, at least in part, accomplished by a process in which a highly thermophilic bacterium, such as modified *Sulfolobus acidocaldarius* DESA-1, acts upon a sulfide mitigation catalyst to oxidize the operative metals of the catalyst. In the present invention, modified *Sulfolobus acidocaldarius* DESA-1 can regenerate the reduced catalyst with or without aeration, although the anaerobic process disclosed herein is believed to be particularly desirable and useful.

A broader aspect of the invention is a biological process for regenerating a sulfide mitigation catalyst by bioregenerating the catalyst by contacting the catalyst with a highly thermophilic microorganism capable of oxidizing the catalyst. In some embodiments, regeneration and mitigation can be carried out in the same reactor. The use of a single reactor according to the present invention is expected to produce considerable savings in capital and operating costs, in part because the costs of an air blower and a second reactor are eliminated.

Another aspect of the invention is a composition having effective amounts of a sulfide mitigation catalyst and a highly thermophilic microorganism capable of oxidizing the catalyst under anaerobic conditions.

The present invention may be better understood by reference to the accompanying drawings in conjunction with the following description of the invention.

DETAILED DESCRIPTION OF THE INVENTION

Figure 1:
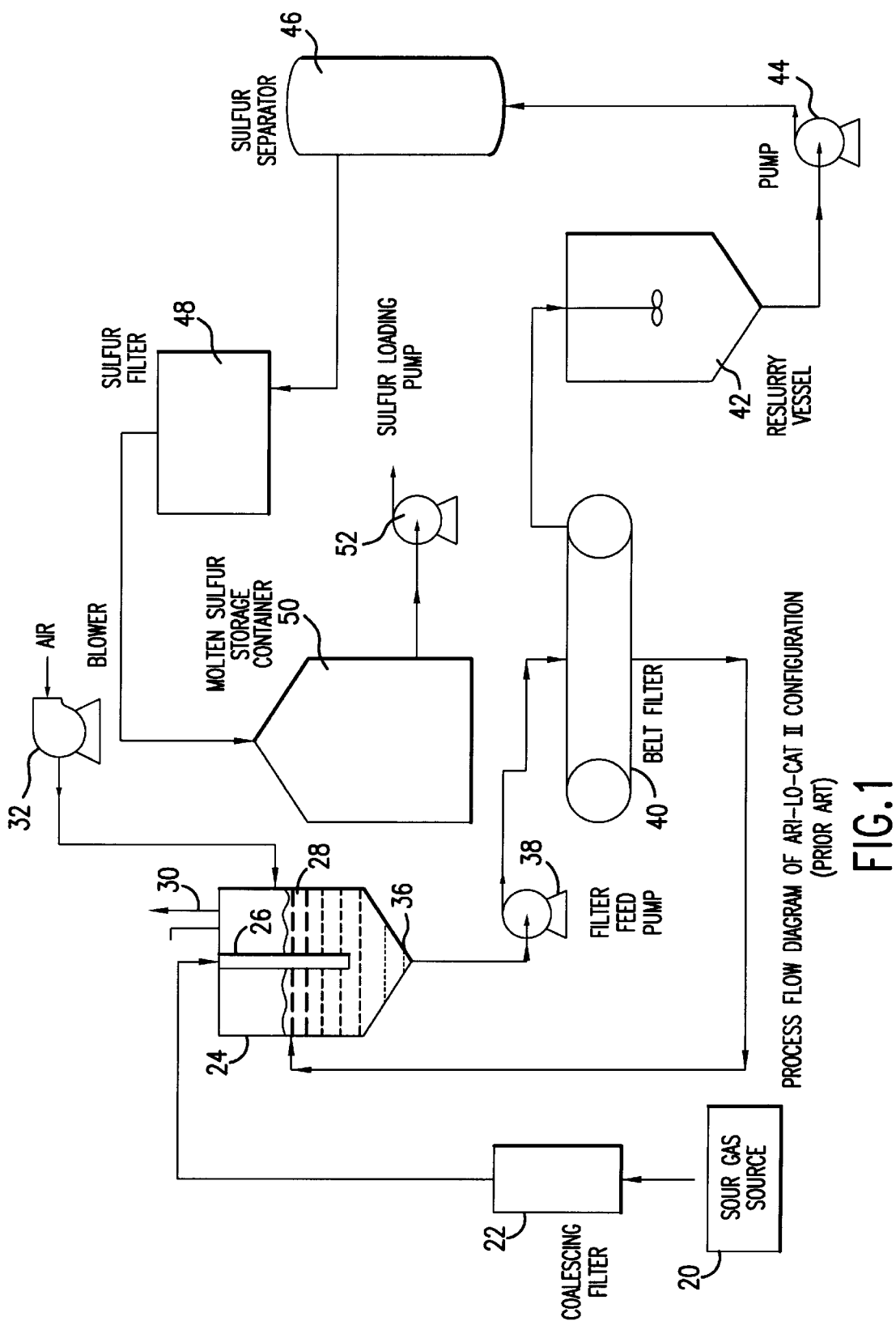
FIG. 1 is a flow diagram illustrating a prior art LO-CAT system in which an aerobic regeneration process may be performed.

The present invention may be carried out under any suitable conditions, the details of which can readily be ascertained by one skilled in this field in view of the present disclosure. Several non-limiting examples of suitable conditions and useful embodiments follow.

The present invention contemplates the use of a highly thermophilic microorganism which is capable of oxidizing sulfide mitigation catalysts that are commonly known in the natural gas processing industry as liquid redox catalysts. These catalysts are used to render natural gas free of hydrogen sulfide and other sulfide species, including without limitation carbonyl sulfide; carbon disulfide; and dimethyl, ethyl, and methyl mercaptans. Highly thermophilic microorganisms in the context of the present invention are those whose optimal temperature for growth is at least 40° C. (104° F.). Accordingly, *T. ferrooxidans* is not a highly thermophilic microorganism because its optimal growth temperature is below 40° C.

Microorganisms suitable for the present invention are those which are capable of oxidizing sulfide mitigation catalysts. Suitable genera of highly thermophilic microorganisms include, without limitation, Sulfolobus and Acidianus bacteria. Of particular interest is the bacterial strain *S. acidocaldarius* DESA-1, a bacterium capable of metabolizing sulfur. This bacterium is able to grow in the absence of air through sulfur oxidation. *S. acidocaldarius* DESA-1 has optimal growth at temperatures in the range of 70° C. to 75° C. (158° F. to 167° F.), although it shows good growth at 85° C. (185° F.) as well.

Among the sulfide mitigation catalysts contemplated for use with the present invention are iron and vanadium catalysts, including ferric chelates and ferric sulfates. Catalysts which have other transition metals also may prove useful with the present invention. Of particular suitability is ARI LO-CAT II® catalyst, a ferric chelate catalyst sold by ARI, which is now a subsidiary or division of Wheelabrator Clean Air Systems, Plainfield, Ill. The exact chemical composition of ARI LO-CAT II® catalyst is unknown to the inventors, as ARI considers it proprietary information. Examples of ferric chelates which mitigate sulfides and which may be employed in connection with the present invention are chelates of iron complexed with ethylene diaminetetraacetic acid (EDTA), polyhydroxylated sugars, or mixtures thereof. However it is contemplated that the present invention will be useful with any iron catalyst that is reduced from ferric to ferrous form by mitigating sulfur, and therefore requires regeneration to its ferric form.

Another aspect of the present invention is a composition useful in the mitigation of sulfur compounds from natural gas streams. The composition consists of an effective amount of a sulfide mitigation catalyst and at least about 10 g/L of a highly thermophilic microorganism capable of oxidizing the catalyst. Alternately, the composition may be comprised of one hundred grams of microorganism per liter of catalyst.

Figure 2:
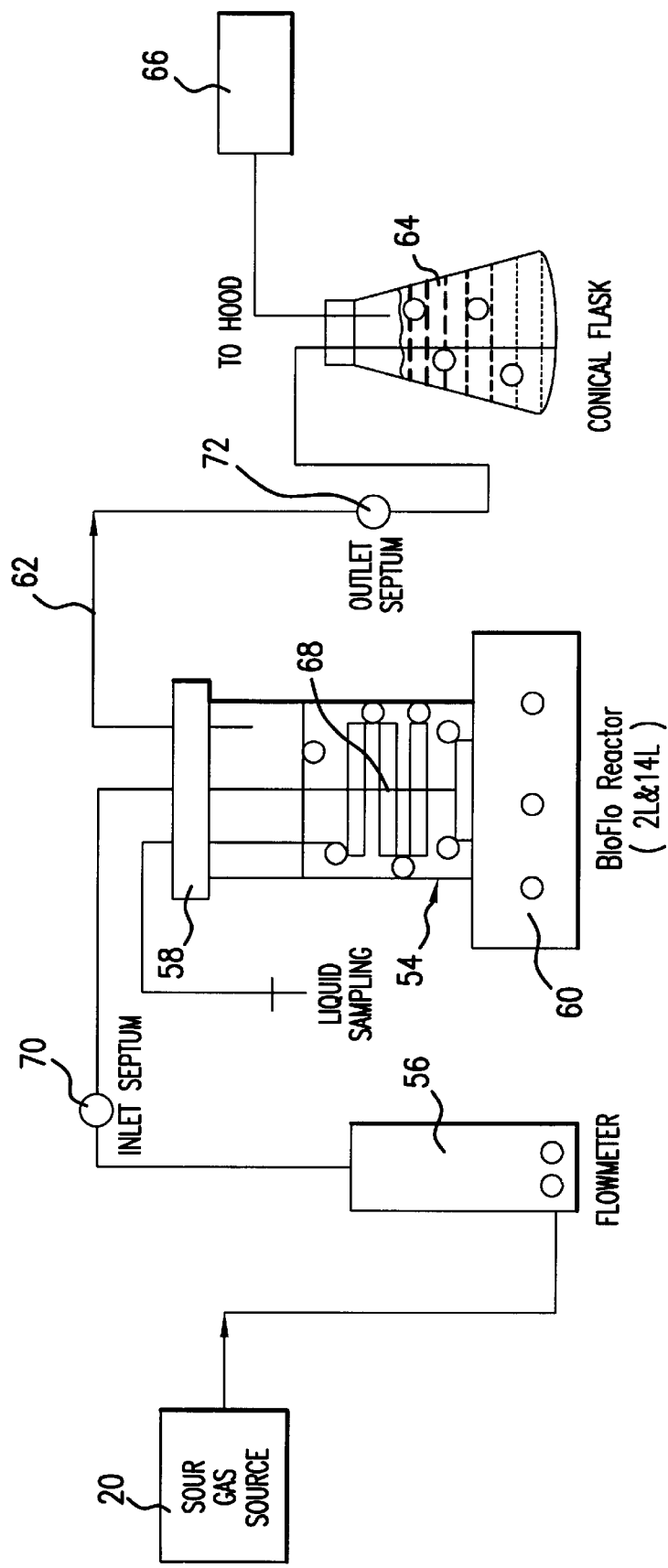
FIG. 2 is a flow diagram illustrating an experimental reactor system useful for catalytic mitigation and regeneration processes according to the present invention.

In the experimental reactor set-up illustrated in FIG. 2, a liquid sample of the ARI LO-CAT II® catalyst (four times diluted, or diluted to another suitable degree) is loaded into a reactor 54, such as a BioFlo Reactor obtained from New Brunswick Scientific Co. A bacterium capable of bioregenerating reduced ARI LO-CAT II® catalyst, such as Sulfolobus or Acidianus, is loaded into the reactor. Thiobacillus may also be loaded in the reactor 54. Approximately one hundred grams (wet weight) of bacteria are loaded into the reactor 54 for each liter of ARI LO-CAT II® catalyst loaded. In the present invention, the reactor 54 will at least contain diluted catalyst and bioregenerating bacteria; however, additional ingredients, such as nutrients suitable for the strain of bacterium used, may also be loaded into the reactor 54 initially.

A flowmeter 56, such as a Brooks flowmeter, measures the flow rate of the gas passed into the reactor from a sour natural gas source 20. The reactor 54 is sealed with a stainless steel flange top 58. The sour natural gas or another gas to be desulfurized is sparged into the reactor 54 through a sparger 60 at the bottom. The treated gas from the reactor 54 is passed through a line 62 to a sealed Erlenmeyer flask 64 filled with water. The sweet gas bubbles through the water out to a desired repository 66 such as storage or a fumehood. Bubbles in the flask 64 downstream from the reactor indicate that the connections are leak proof. The reactor may also be equipped with an agitator 68 in order to maintain the mixture in suspension. The gas concentrations of the sour natural gas entering and exiting the reactor 54 are determined from samples obtained via an inlet septum 70 and an outlet septum 72, respectively.

Figure 3:
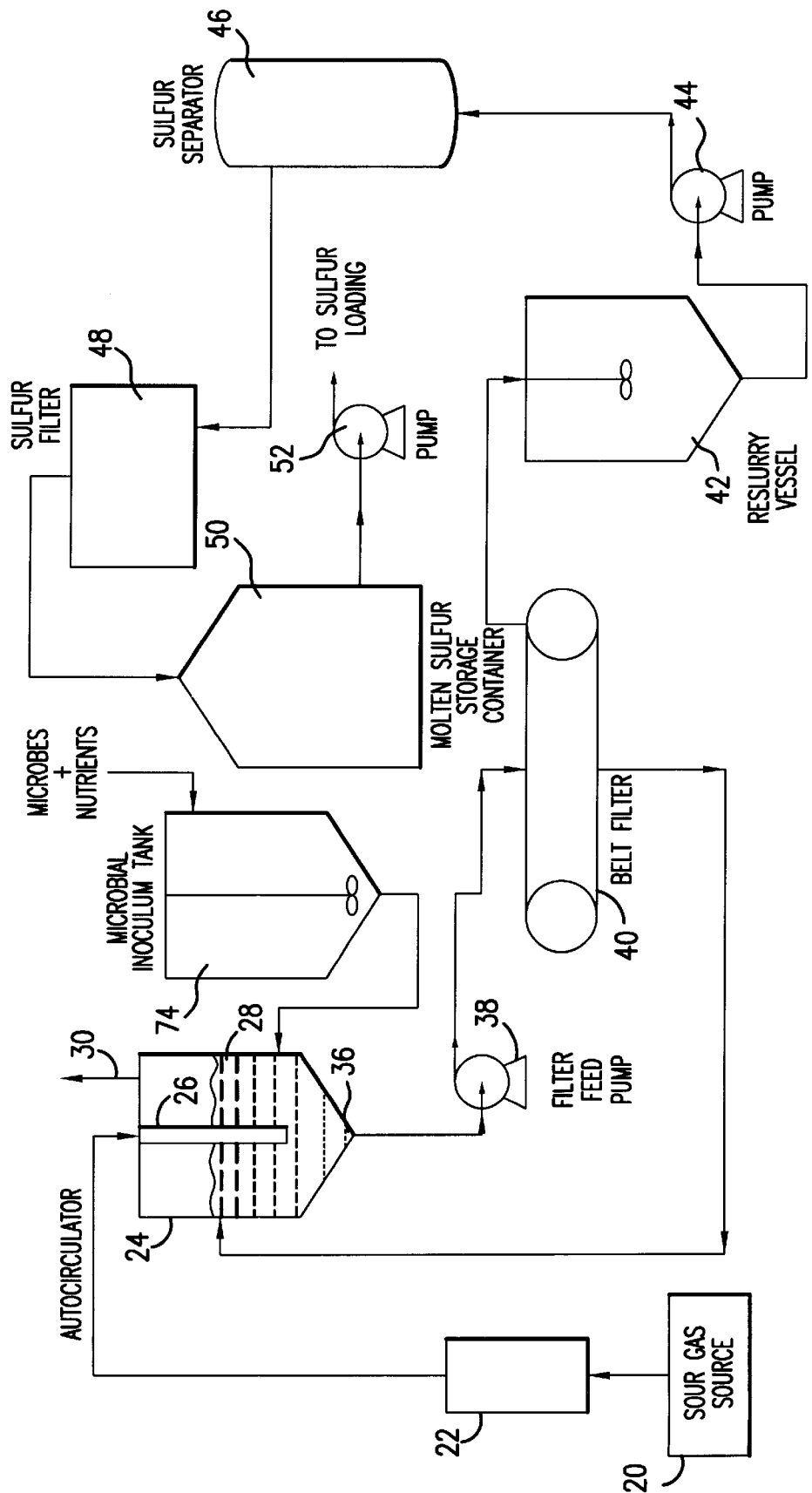
FIG. 3 is a flow diagram illustrating another system in which an anaerobic regeneration process may be performed.

An alternate system which employs the present invention is depicted in FIG. 3. The system of FIG. 3 differs from that of FIG. 1 in that the system of FIG. 3 does not include an air blower and does include a microbial inoculum tank 74 for the periodic introduction of microbes and nutrients to the reactor 24 as needed. No air blower is required because the system depicted in FIG. 3 employs the present invention to regenerate the ARI LO-CAT II® catalyst in a substantially anaerobic process. In a substantially anaerobic process, the concentration of soluble oxygen is about 0.2 ppm by volume or less.

The sour natural gas or other gas to be desulfurized passes from the coalescing filter 22 to the reactor 24 where it is sparged into the process solution 28 through a sparger 26. The treated gas bubbles out of the solution and exits from the reactor 24 via an exit conduit 30 to storage or a pipeline.

Precipitated sulfur accumulates at the bottom cone 36 of the reactor 24. The system of FIG. 3 employs a filter feed pump 38, a belt filter 40, and a reslurry vessel 42 as described in the system of FIG. 1. A slurry pump 44 may be employed to pump the slurry to the sulfur separator 46. From the sulfur separator 46 the slurry passes to a sulfur filter 48 which separates smaller sulfur particles from liquids. Molten sulfur advances to the molten sulfur storage container 50 and the liquids recirculate to the reactor 24. A sulfur loading pump 52 may also be provided.

The present invention may be employed in the systems depicted in FIGS. 1, 2 and 3 by depositing an effective number of a highly thermophilic bioregenerating bacterium into the reactor. For example, the invention may be employed in the system depicted in FIG. 1 in a microaerophilic process where the concentration of soluble oxygen is 2 ppm by volume or less. Alternatively the invention may be employed in a substantially anaerobic process where the concentration of soluble oxygen is about 0.2 ppm by volume or less.

The bacterium will grow and thrive in the reactor even during operation of the LO-CAT process. Occasionally, mineral nutrient can be provided to the reactor; however, if the reactor is kept under proper operating parameters, the bacterium will survive and reproduce.

When *S. acidocaldarius* DESA-1 is employed in the system shown in FIG. 1, the air flow into the reactor 22 can be significantly reduced or completely eliminated, as the regeneration of the ARI LO-CAT II® catalyst will be accomplished by microbial action.

Any suitable reactor can be used. The reactors of FIGS. 1, 2 and 3 as described above are examples, and other reactors suitable for practicing the invention will be apparent to those familiar with sulfide mitigation catalyst technology. The reactor may contain packing material or an inert carrier upon which the microorganism may be immobilized or form a biofilm. Suitable packing materials and carriers include nylon mesh, glass beads, alginates, Careegenan, ultrapure sand, silica gel, and plastic covered sponges. Nylon is the preferred carrier for *Sulfolobus acidocaldarius* DESA-1.

The pressure of the sour natural gas stream can vary widely, without departing from the present invention. Atmospheric pressure and elevated pressures are specifically contemplated, though a sub-atmospheric pressure could also be used within the scope of the present invention. An elevated pressure from about 75 psi (52 N/cm$^2$) to a pressure of or exceeding about 1000 psi (700 N/cm$^2$) is specifically contemplated herein.

The reactor vessel may be maintained at any suitable temperature, for example, a temperature range of from about 10° C. to about 80° C. (about 50° F. to about 176° F.).

$H_2S$ can be present in the sour natural gas stream at any suitable concentration, for example, from a nominal concentration to about 10,000 ppm. Optionally, the concentration of $H_2S$ can be more than about 200 ppm, optionally more than about 5,000 ppm. The concentration can also vary within the scope of the invention.

The reactor vessel can contain from about 0.35% to about 10% biomass, or alternately at least about 5% biomass. Any suitable concentration of the biomass can be used, within the scope of the present invention. Generally, it is contemplated that at least fifty grams, alternately at least one hundred grams, of bacterium (wet weight) per liter of sulfide mitigation catalyst will be used.

The sour natural gas or other input gas stream which can be processed according to the present invention can contain hydrogen sulfide or other sulfur compounds. For example, any one or more of the following compounds may be present, and can be removed from the input gas stream by carrying out the present invention: $H_2S$, $CH_3SH$, $C_2H_5SH$, $(CH_3)_2S$, $CS_2$, or mixtures of any two or more of the foregoing species.

Bacterial cultures for the experiments described herein were obtained from commercial sources. Specifically, *Sulfolobus acidocaldarius* DESA-1 and *Thiobacillus ferrooxidans* were obtained from the American Type Culture Collection (ATCC), while the bacterium *Acidianus brierleyi* was obtained from Deutsche Samlung von Mikroorganismen (DSM), Germany. The *Sulfolobus acidocaldarius* DESA-1 and the Acidianus cultures were further developed at the ARCTECH laboratories through classical microbiological procedures to utilize hydrogen sulfide and other common contaminants of sour natural gas and therefore are not the same organisms as those obtained from ATCC and DSM. Bacterial cultures were modified by exposure to hydrogen sulfide at high pressure for periods of three to five months. These modified bacteria had the capability not only to survive in the presence of hydrogen sulfide and other sulfur containing gases but to consume such gases and thrive in their presence. These modified bacteria are novel in themselves.

The cultures were grown by inoculating the appropriate medium for each of the bacteria with the inocula obtained from ATCC or DSM. The bacteria were grown for at least 24 hours at the appropriate temperature (70° C. for *S. acidocaldarius* and *A. brierleyi*, 37° C. for *T. ferrooxidans*) before they were harvested by the procedure described below. To grow *T. ferrooxidans*, five mL of the *T. ferrooxidans* inoculum was used to inoculate 100 mLs of the Thiobacillus medium. To grow *S. acidocaldarius* DESA-1, one mL of *S. acidocaldarius* DESA-1 inoculum was used to inoculate twenty-five mL of the Sulfolobus medium. The pH was adjusted to 3.0 with 6 N $H_2SO_4$. The medium was filtered and sterilized prior to use. To grow *Acidianus brierleyi*, 0.25 mL of the *Acidianus brierleyi* inoculum was used to inoculate fifty mL of the Acidianus medium. The pH was adjusted to 2.0 with 6 N $H_2SO_4$. The yeast extract (10% w/v in distilled water) was autoclaved separately, and the sulfur was sterilized for 3 hours on each of the successive days. The media used to grow the cultures are shown in Tables A, B and C. In preparing the Thiobacillus medium shown in Table B, Solutions A and B were autoclaved separately and combined aseptically after cooling. The pH was adjusted to 2.8 with 6 N $H_2SO_4$.

TABLE A

Sulfolobus Medium

| COMPONENT | QUANTITY |
|---|---|
| Ammonium sulfate | 1.3 g |
| Potassium phosphate | 0.28 g |
| Magnesium sulfate (heptahydrate) | 0.25 g |
| Calcium chloride (dihydrate) | 0.07 g |
| Ferric chloride (hexahydrate) | 0.02 g |
| Manganese chloride (tetrahydrate) | 1.8 mg |
| Sodium borate | 4.5 mg |
| Zinc sulfate (heptahydrate) | 0.22 mg |
| Cuprous chloride (dihydrate) | 0.05 mg |
| Sodium molybdate (dihydrate) | 0.03 mg |
| Cobalt sulfate | 0.01 mg |
| Tryptone (Difco 0123) | 1.0 g |
| Distilled water | 1.0 L |

TABLE B

Thiobacillus Medium

| COMPONENT | QUANTITY |
|---|---|
| Solution A: | |
| Ammonium sulfate | 0.4 g |
| Potassium phosphate | 0.2 g |
| Magnesium sulfate (heptahydrate) | 0.08 g |
| Distilled water | 400.0 ml |

TABLE B-continued

Thiobacillus Medium

| COMPONENT | QUANTITY |
| --- | --- |
| Solution B: | |
| Ferrous sulfate (heptahydrate) | 10.0 g |
| 1 N Sulfuric acid | 1.0 ml |
| Distilled water | 100.0 ml |

TABLE C

Acidianus brierleyi Medium

| COMPONENT | QUANTITY |
| --- | --- |
| Ammonium sulfate | 3.0 g |
| Potassium phosphate (trihydrate) | 0.5 g |
| Magnesium sulfate (heptahydrate) | 0.5 g |
| Potassium chloride | 0.1 g |
| Calcium nitrate | 0.01 g |
| Yeast extract | 0.2 g |
| Sulfur (flowers) | 10.0 g |
| Distilled water | 1.0 L |

The microorganisms were harvested from their media by the following procedure. The inoculated media were centrifuged in a microcentrifuge at 13,000 rotations per minute ("r.p.m.") for 15 minutes, after which the supernatant was run off. The pellet was washed twice with 50 mM Tris-HCl buffer (pH=7) and was resuspended. In the Experiments discussed below, the pellet was resuspended in the ARI LO-CAT II® catalyst solution.

EXAMPLES

The following are several working examples illustrating how the present invention can be carried out. The scope of the invention is not limited in any way by the specific apparatus, conditions, and other details set out in the examples.

In many of the experiments disclosed herein, a completely reduced ARI LO-CAT II® catalyst was inoculated with the bacterium subject and/or was sparged with air. The effectiveness of the bacterium and/or air sparging was evaluated by measuring the change in the redox potential of the reduced catalyst over time. A greater change over time indicates better oxidation kinetics and faster regeneration.

Typically, the reduced catalyst used in experiments was prepared as follows. A 2-L BioFlo reactor as shown in FIG. 2 was filled with 400 mL of four times diluted ARI LO-CAT II® catalyst (one part catalyst solution, three parts water). The original ARI LO-CAT II® solution obtained commercially from ARI had a pH of 8, redox potential of +138 mv, ferric iron concentration of 0.3903 g/L, and ferrous iron concentration of 0 g/L. When diluted four times, the solution typically had a pH of about 7.8, and redox potential of about +67 mv. Hydrogen sulfide was sparged into the BioFlo reactor at 1.2 L/h to completely reduce the ARI LO-CAT II® catalyst to a redox potential of −100 mv.

The particular methods of regeneration (by Sulfolobus or by other action) are described below in connection with each of the individual experiments. Throughout the experiments, regeneration of the ARI LO-CAT II® catalyst in each flask was measured either as the redox potential in millivolts at measured times or the rate of change in redox potential at measured times. The redox potential was measured with an ORION model 96-78 redox electrode which combines a platinum redox and a silver/silver chloride reference electrode in one body. The electrode was made of an epoxy body with a sleeve junction. The electrode was connected to the meter, the function switch was set to the millivolt mode, and the electrode was calibrated in two standard buffers of 192 and 256 mv. Then the electrode was inserted in the sample and the redox potential of the same was measured.

Experiment I

Based on their properties reported in the literature, four different kinds of microorganisms were evaluated for their abilities to regenerate sulfide mitigation catalysts. *T. ferrooxidans* was used as a reference point and was selected based upon its known ability to regenerate catalysts. *S. acidocaldarius* DESA-1 and *Acidianus brierleyi* were also selected for their reported abilities to metabolize and oxidize sulfur compounds. In earlier research, ARCTECH developed a microbial consortium, SS-II, from ARCTECH'S Microbial Culture collection (AMCC) to reduce the $H_2S$ concentrations of up to 10,000 ppm to pipeline specifications of $\leq 4$ ppm. The biological and technical feasibility of the consortium to mitigate 1% $H_2S$ to $\leq 4$ ppm are the subject of a separate patent application. The ARCTECH SS-II consortium, a culture proprietary to ARCTECH, was selected for evaluation based upon its superior ability to mitigate hydrogen sulfide and other sulfides from sour natural gas. Processes of mitigating hydrogen sulfide and other sulfur species from sour natural gas employing the ARCTTECH SS-II consortium are the subject of a separate patent application. (U.S. patent application Ser. No. 08/651,793).

The ability of each of the four cultures to regenerate reduced catalysts was evaluated in the following fashion. Aliquots of 100 mL of reduced ARI LO-CAT II® catalyst were transferred to 250-mL Erlenmeyer flasks. Control flasks were not inoculated with any bacteria. Approximately 10 g (wet weight) of the test microorganism were resuspended in the ARI LO-CAT II® catalyst and added to the experimental flasks. At least three flasks were prepared for each given set of tested parameters (pH and temperature). Experiment I was conducted at atmospheric pressure and without sparging. Flasks were placed in a shaker incubator where they were agitated at a rate of 100 rotations per minute. The rate of oxidation was measured as the redox potential of the catalyst at set intervals of time.

Figure 4:
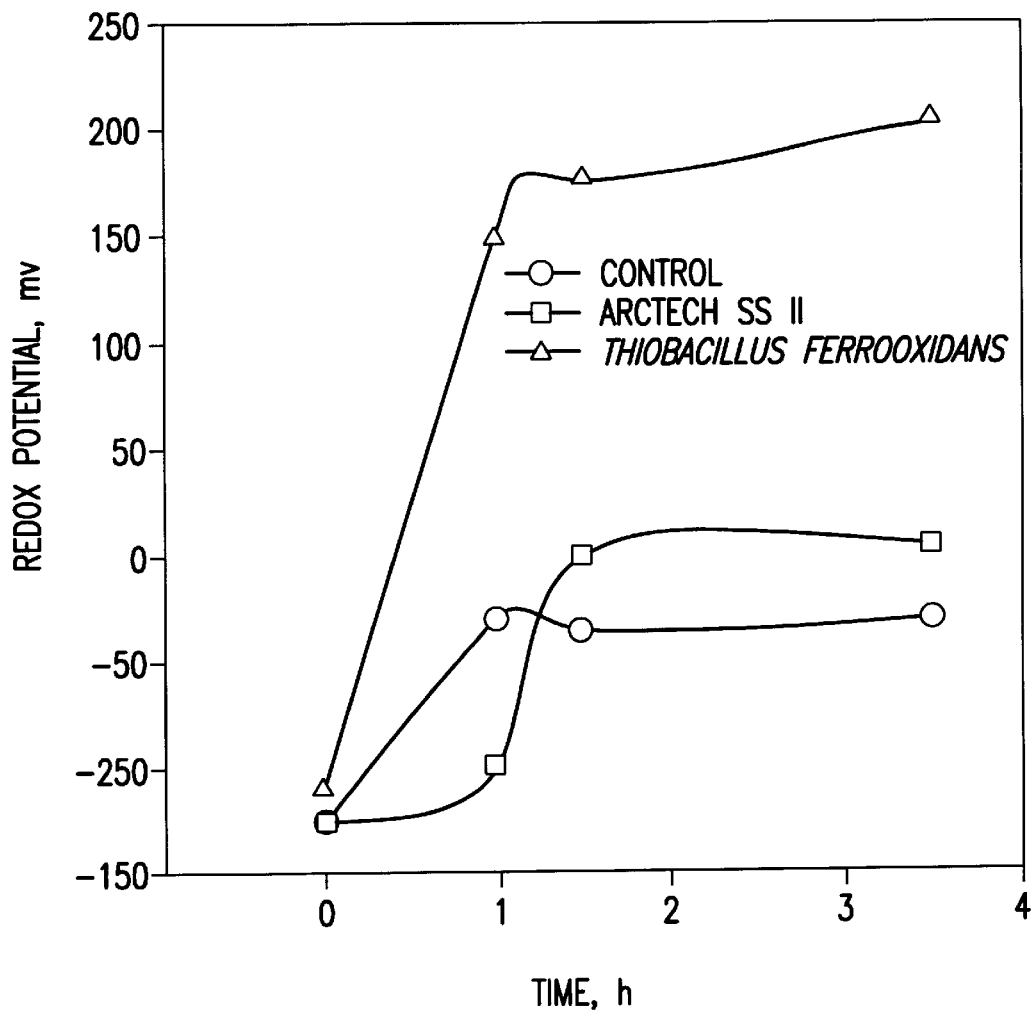
FIG. 4 is a graph showing the regeneration of ARI LO-CAT II® catalyst by *Thiobacillus ferrooxidans* and by ARCTECH SS-II consortium as a function of regenerated redox potential.

The results of Experiment I are shown in FIGS. 4 through 7. In FIG. 4, the regeneration of the catalysts by *T. ferrooxidans* and the ARCTECH SS-II consortium at atmospheric pressure and ambient temperature (about 25° C.) are shown. Although the ARTECH SS-II consortium initially succeeded in increasing the redox potential of the catalyst, that increase eventually leveled off. The ARCTECH SS-II consortium did not regenerate the catalyst to an appreciable degree under these experimental conditions. In contrast, *T. ferrooxidans* regenerated the catalyst, raising the measured redox potential to useful levels within an hour.

Figure 5:
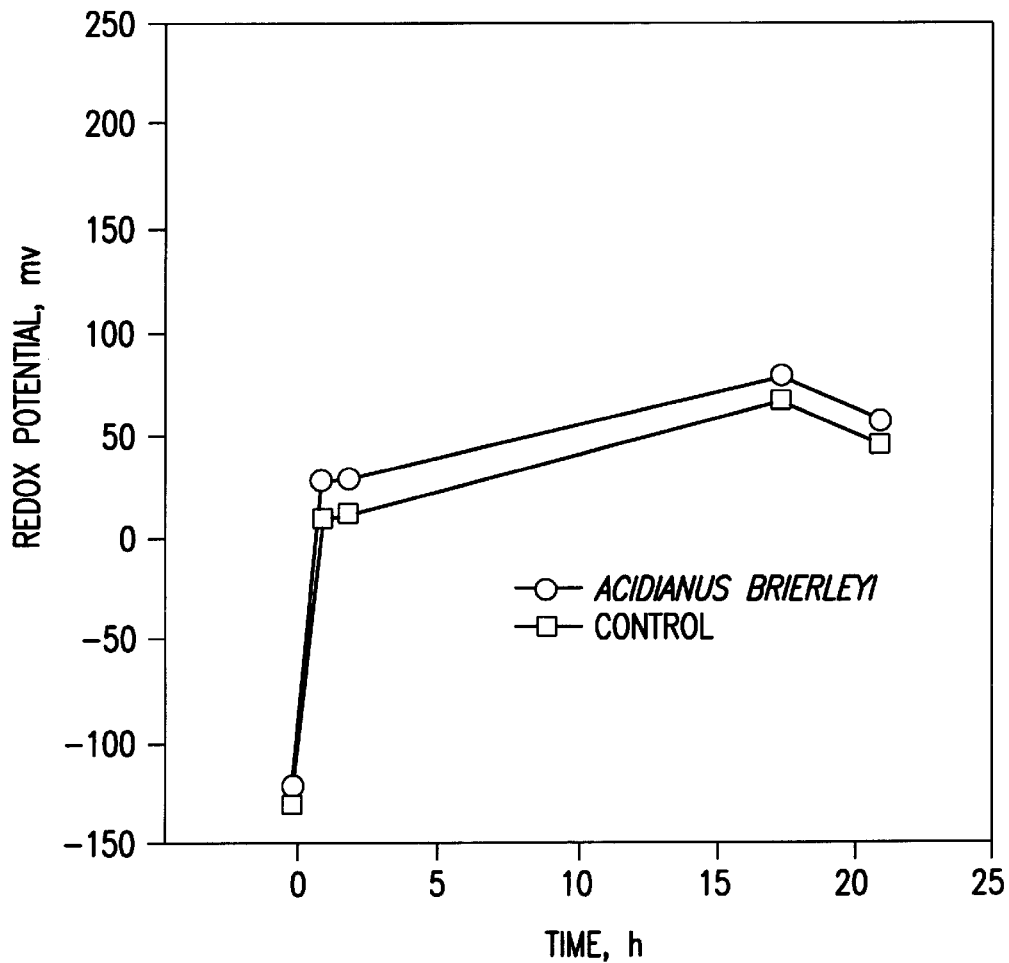
FIG. 5 is a graph showing the regeneration of ARI LO-CAT II® catalyst by *Acidianus brierleyi* at 25° C. (about 77° F.) as a function of regenerated redox potential.
Figure 6:
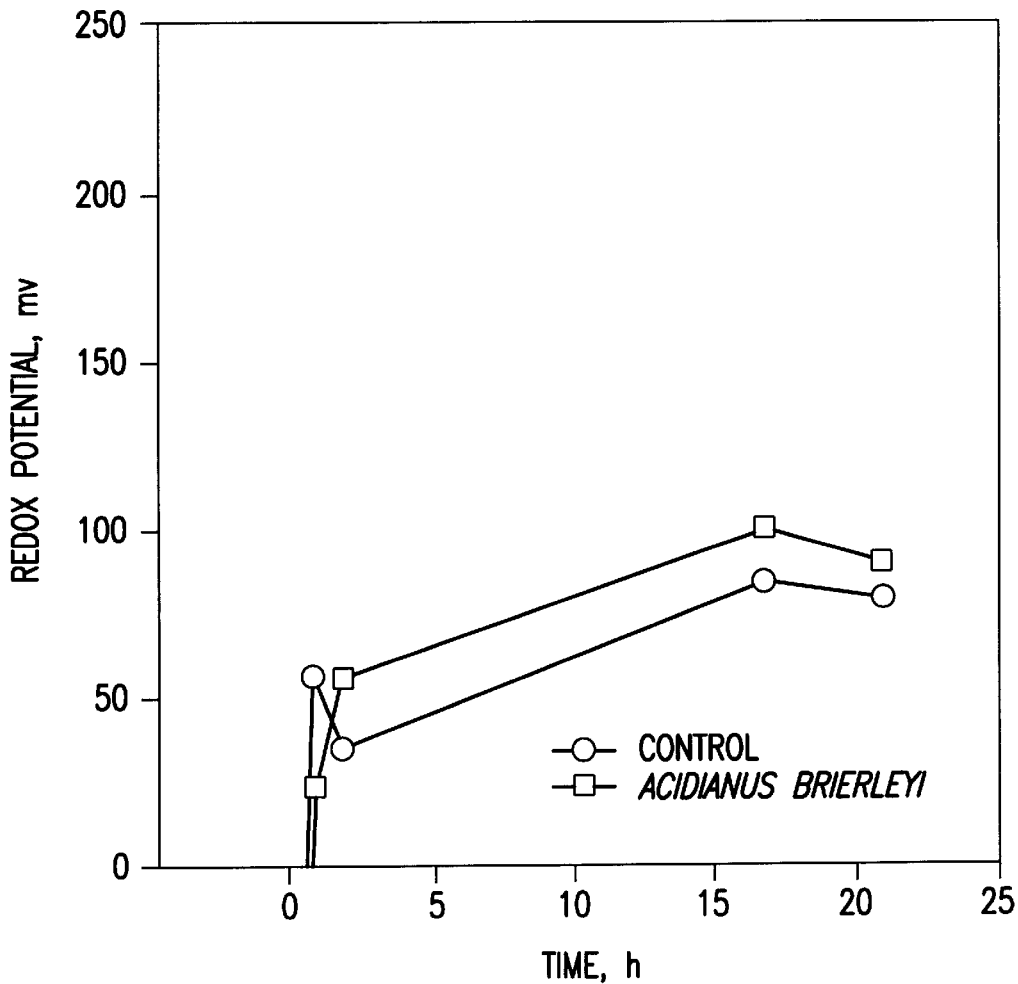
FIG. 6 is a graph showing the regeneration of ARI LO-CAT II® catalyst by *Acidianus brierleyi* at 70° C. (about 158° F.) as a function of regenerated redox potential.

FIGS. 5 and 6 show the results of tests evaluating the regenerative potential of *Acidianus brierleyi* at 25° C. and 70° C. At both temperatures, the total regeneration accomplished by the Acidianus bacterium was slightly better than the regeneration which occurred in the controls, which were not inoculated with any bacterium and were not sparged with air.

Figure 7:
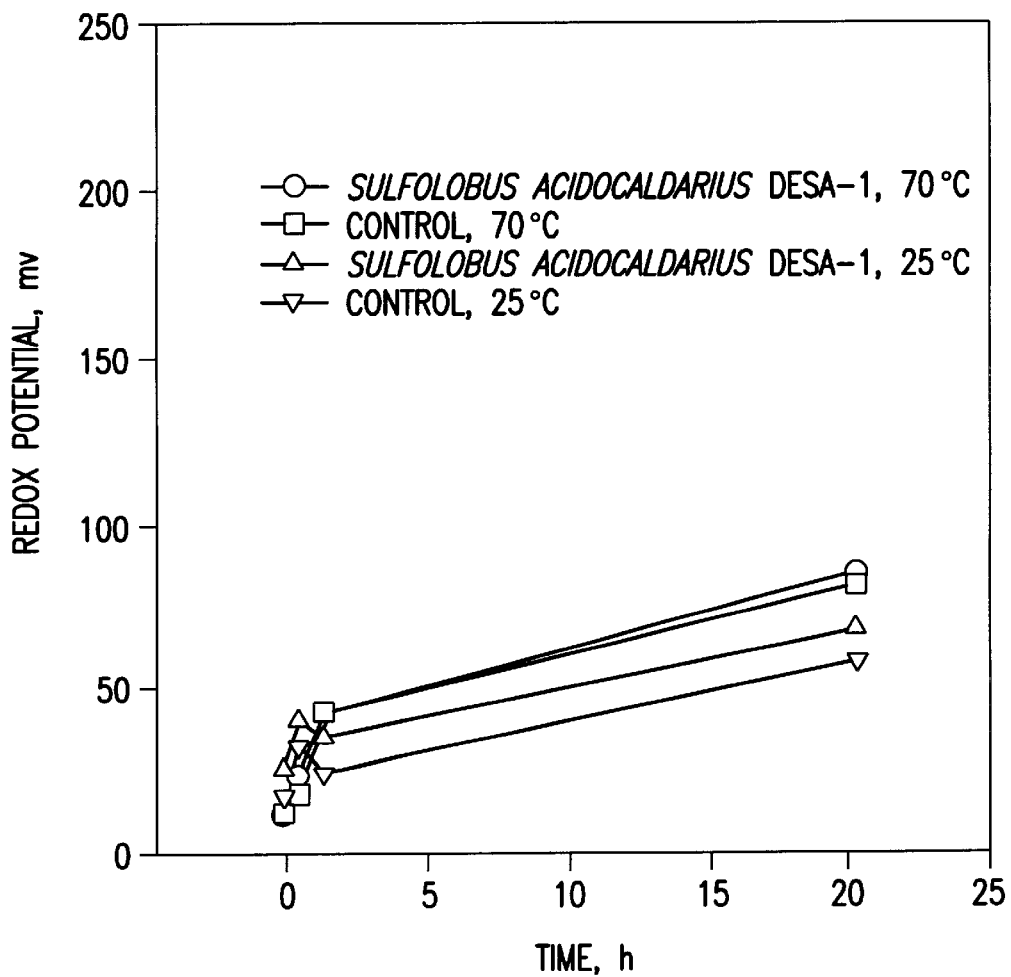
FIG. 7 is a graph showing the regeneration of ARI LO-CAT II® catalyst by *Sulfolobus acidocaldarius* at 25° C. and at 70° C. as a function of regenerated redox potential.

FIG. 7 shows the regeneration by *Sulfolobus acidocaldarius* DESA-1 of the ARI LO-CAT II® catalyst as a function of the redox potential of the catalyst at set intervals of time. The regeneration by *Sulfolobus acidocaldarius* DESA-1 at 25° C. after twenty hours by the microorganism was considered favorable as compared to the control at 25° C., which prompted further experimentation regarding the oxidation kinetics involving that microorganism.

Experiment II

Experiment II shows the preferred process conditions for regeneration of reduced ARI LO-CAT II® catalyst by *S. acidocaldarius* DESA-1 and *T. ferrooxidans*. Reduced ARI LO-CAT II® catalyst was prepared as described above. Aliquots of 100 mL of the reduced catalyst were distributed into 250-mL Erlenmeyer flasks and inoculated with 10 g (wet weight) of either *T. ferrooxidans* or *S. acidocaldarius*. Control flasks were not inoculated with any bacterial species to be tested. At least three flasks were prepared for each given set of tested parameters (pH and temperature). Flasks were placed in a shaker incubator where they were agitated at a rate of 100 rotations per minute ("r.p.m."). The rate of oxidation was measured as the rate of change in redox potential at selected points in time.

In Experiment II, the rate of bioregeneration of ARI LO-CAT II® by *T. ferrooxidans* was evaluated at different pH's of 2, 3, 4, 6, and 5.84 (the natural (optimal) pH of the bacterium). The pH's were initially established by addition of appropriate amounts of concentrated sulfuric or hydrochloric acid. Similarly, the bioregeneration of ARI LO-CAT II® by *S. acidocaldarius* at pH's of 2, 3, 4, and 6.55 (the natural (optimal) pH) was also measured. The regeneration rates by each bacterium were determined at two temperatures, 25° C. and 40° C., which were selected because 25° C. is ambient temperature and 40° C. is closer to the temperature of actual operating conditions. The results of Experiment I are shown in FIGS. 8 through 11.

Figure 8:
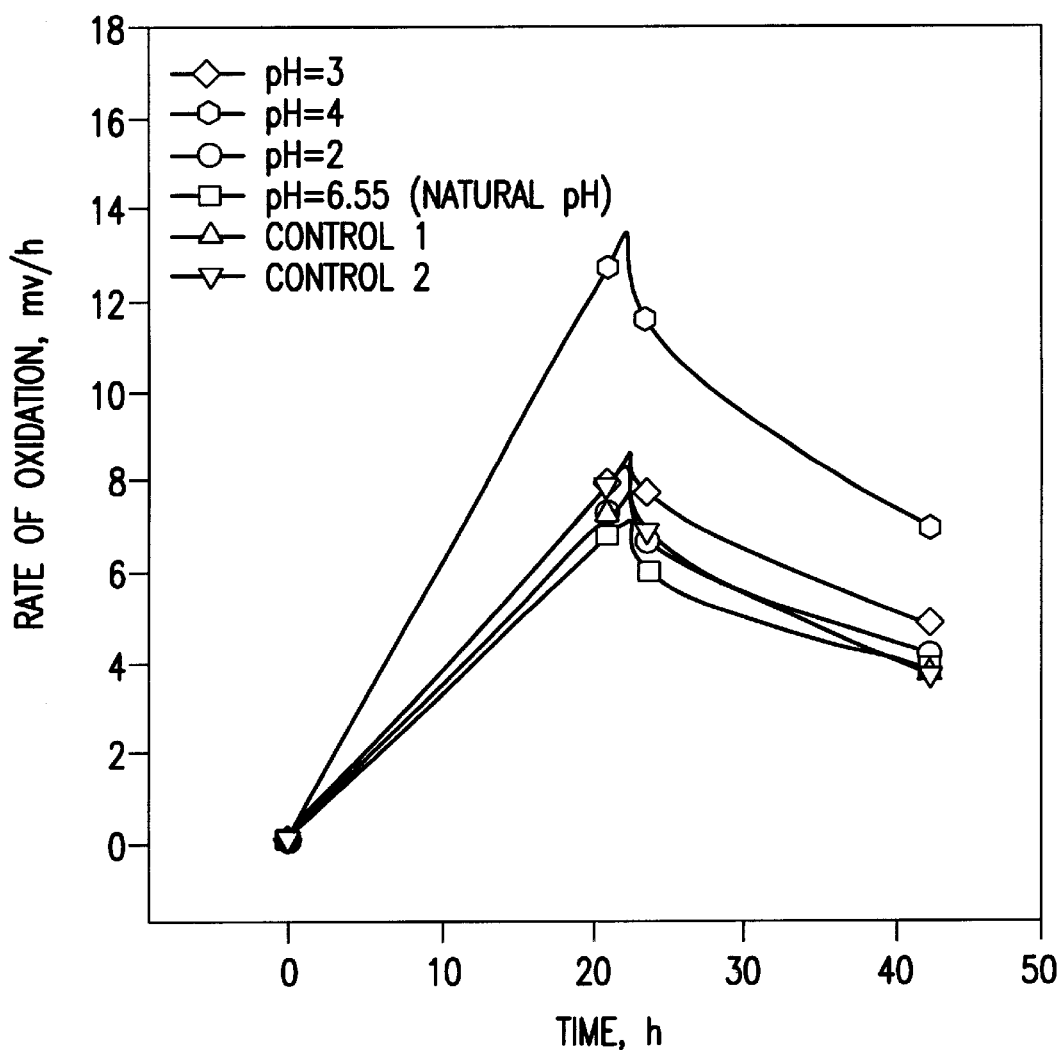
FIG. 8 is a graph showing the rate of regeneration of reduced ARI LO-CAT II® catalyst by *Sulfolobus acidocaldarius* DESA-1 at 25° C. and at various tested pH's.
Figure 9:
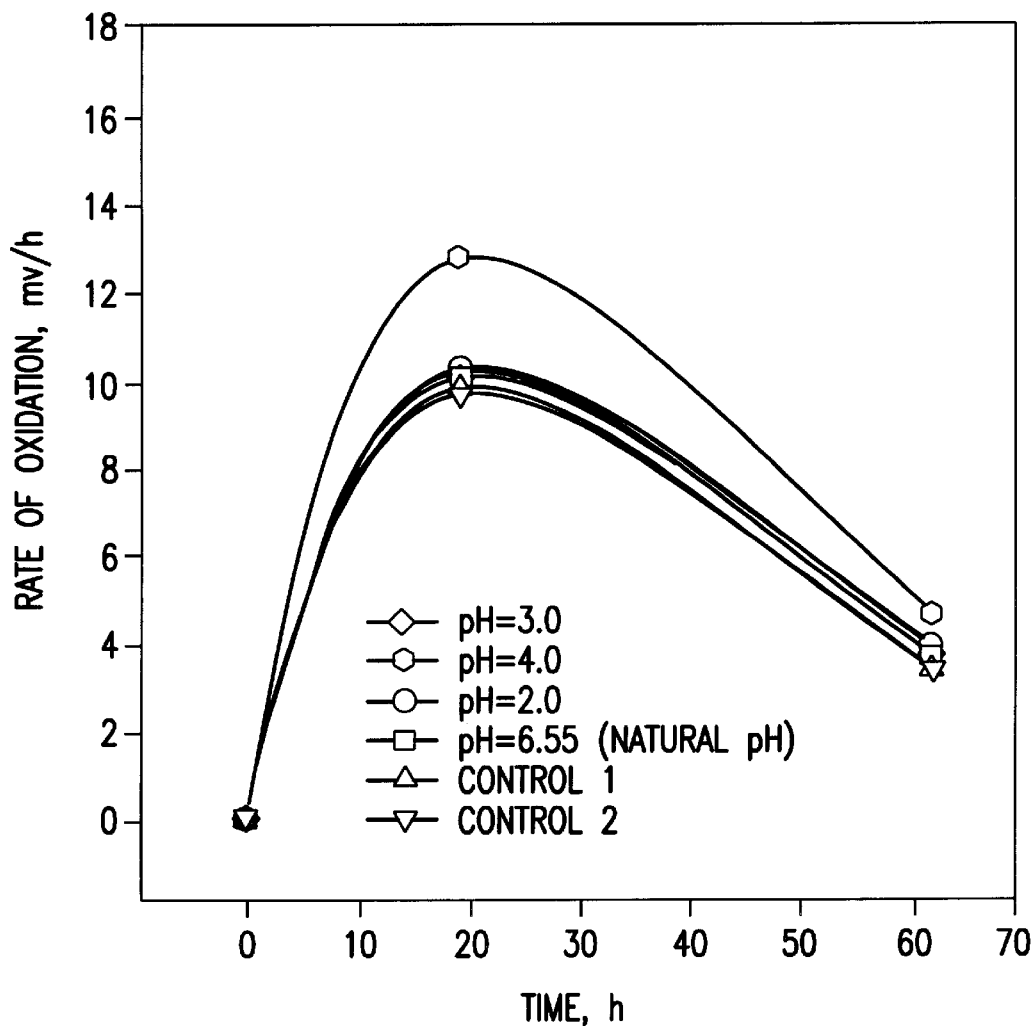
FIG. 9 is a graph showing the rate of regeneration of reduced ARI LO-CAT II® catalyst by *Sulfolobus acidocaldarius* DESA-1 at 40° C. and at various tested pH's.
Figure 10:
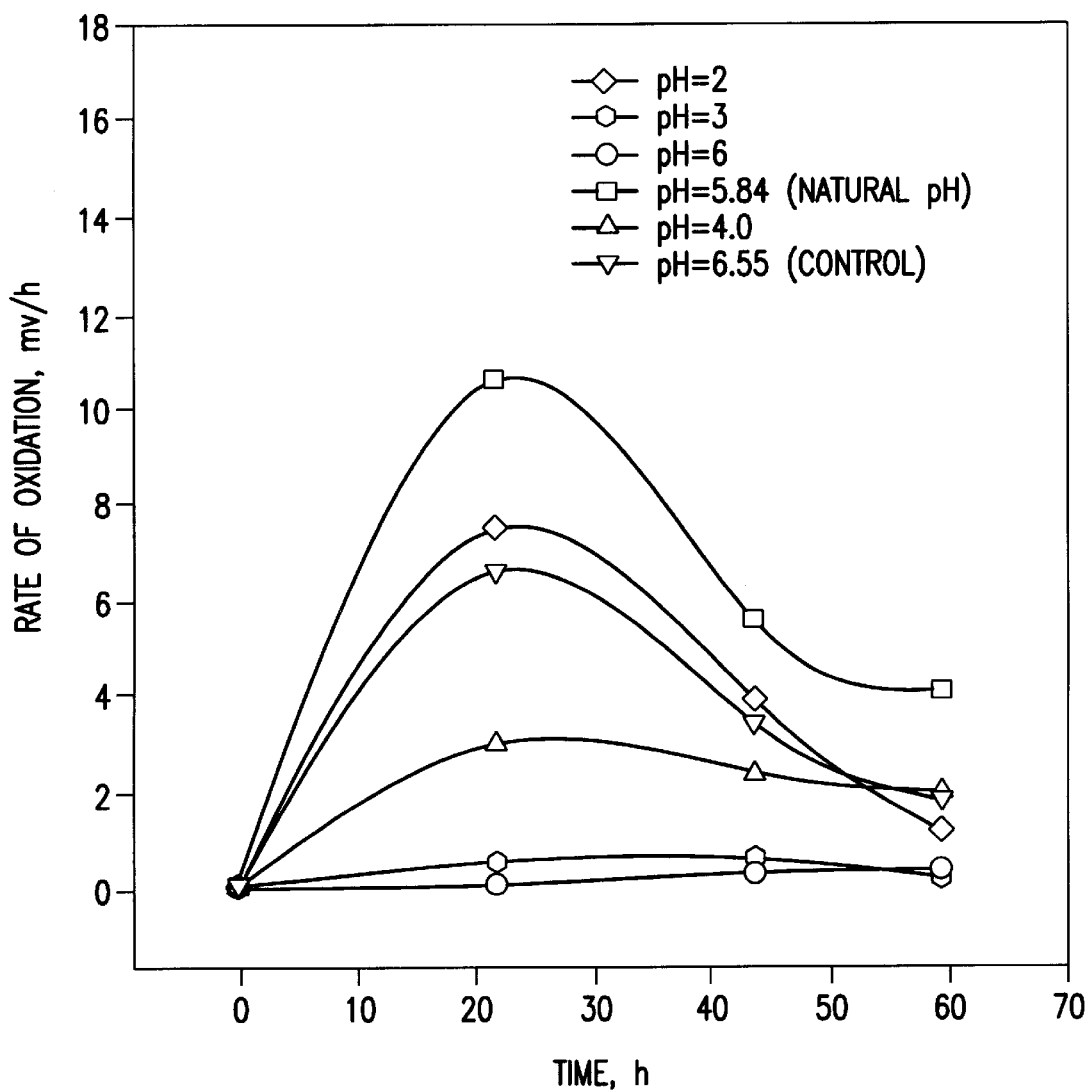
FIG. 10 is a graph showing the rate of regeneration of reduced ARI LO-CAT II® catalyst by *Thiobacillus ferrooxidans* at 25° C. and at various tested pH's.
Figure 11:
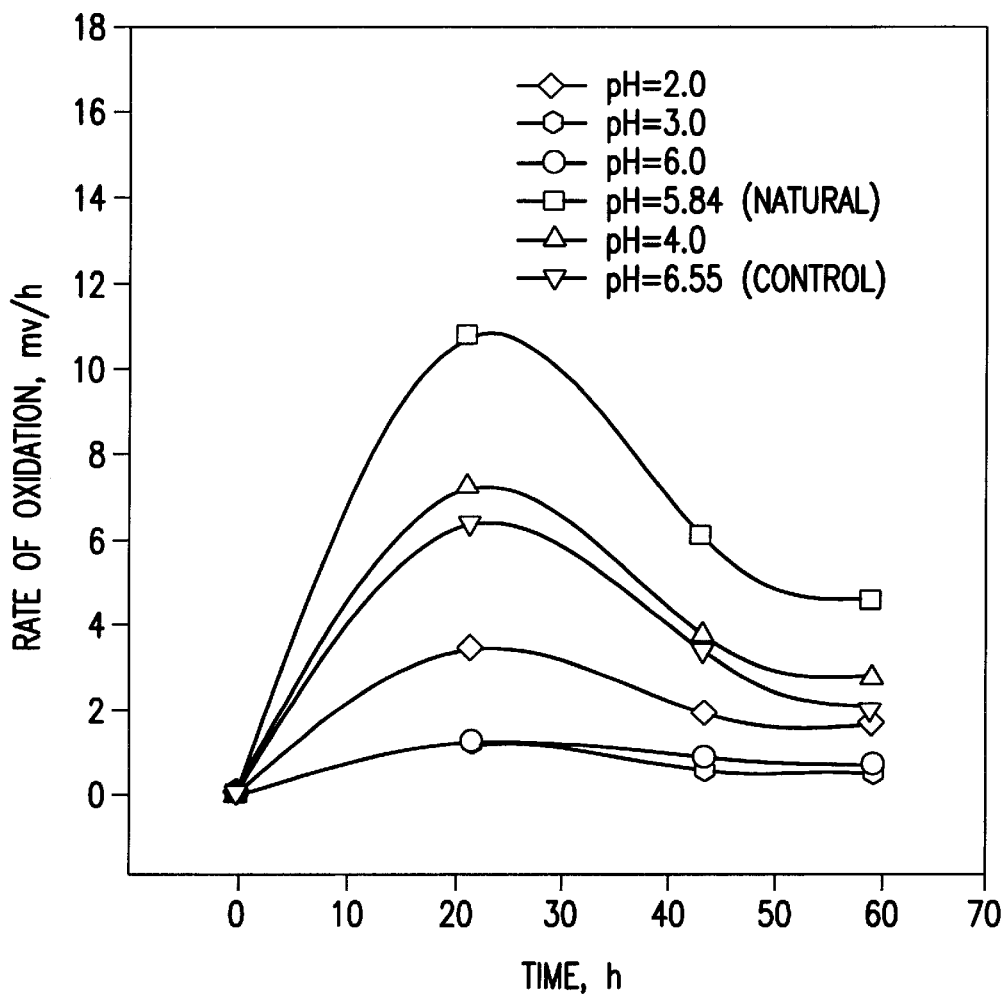
FIG. 11 is a graph showing the rate of regeneration of reduced ARI LO-CAT II® catalyst by *Thiobacillus ferrooxidans* at 40° C. and at various tested pH's.

FIG. 8 shows the results from the runs testing *S. acidocaldarius* DESA-1 conducted at atmospheric pressure and ambient temperature (about 25° C.), wherein the flasks were shaken at 100 r.p.m. and were not sparged with air. FIG. 9 shows the results from the runs testing *S. acidocaldarius* DESA-1 conducted at atmospheric pressure and at 40° C., wherein the flasks were shaken at 100 r.p.m. and were not air sparged. FIG. 10 shows the results from the runs testing *Thiobacillus ferrooxidans* conducted at atmospheric pressure and ambient temperature (about 25° C.), wherein the flasks were shaken at 100 r.p.m. and were not sparged. FIG. 11 shows the results from the runs testing *Thiobacillus ferrooxidans* conducted at atmospheric pressure and at 40° C., wherein the flasks were shaken at 100 r.p.m. and were not sparged.

As shown in FIGS. 8 and 9, the highest rates of oxidation of the ARI LO-CAT II® catalyst by *S. acidocaldarius* DESA-1 were obtained at a pH of 4 at both temperatures (25° C. and 40° C.). Hence the optimal pH for *S. acidocaldarius* among pH's of 2, 3, and 4 is 4. As shown in FIGS. 10 and 11, the highest rates of regeneration by *T. ferrooxidans* were obtained at the natural pH of about 5.84, and the optimal pH for *T. ferrooxidans* among pH's of 2, 3, 4, 5.84 and 6 is the natural pH of 5.84. Experiment II also revealed that, regardless of temperature, the rate of regeneration by *S. acidocaldarius* DESA-1 at both tested temperatures was about 14% higher than the rate for *T. ferrooxidans*, indicating that the superior regeneration rates exhibited by *S. acidocaldarius* DESA-1 over *T. ferrooxidans* are apparently independent of temperature conditions.

Experiment III

Experiment III examined the regeneration of reduced ARI LO-CAT II® catalyst by the tested bacterium with and without sparging. Reduced ARI LO-CAT II® catalyst was prepared as described above. One hundred mL aliquots of the reduced catalyst were distributed into 250-mL Erlenmeyer flasks and inoculated with 10 g (wet weight) of either *T. ferrooxidans* or *S. acidocaldarius*. Corresponding control flasks were not inoculated with any bacterial species to be tested. At least three flasks were prepared for each given set of tested parameters (pH, temperature and sparging vs. nonsparging). The experiment was conducted at atmospheric pressure and the air flow on sparged samples was kept constant at 0.19 SCFM (standard cubic feet per minute) (0.09 L/sec). Flasks were placed in a shaker incubator where they were agitated at a rate of 100 r.p.m. and maintained under constant pH, temperature and, when sparged, air flow. Changes in redox potential of the ARI LO-CAT II® catalyst were measured by the ORION meter. The average results from this experiment are shown in Table D. Table E shows the mathematical ratios of the regeneration rates obtained in the nonsparged environments shown in Table D under varying pH and temperature conditions.

TABLE D

The Rate of Regeneration by *Thiobacillus ferrooxidans* and *Sulfolobus acidocaldarius* DESA-1 at various pH and temperatures.

| Organisms | pH | Temp, °C. | Rate of Regeneration (mv/h) Sparge | Non-Sparging | Fold Increase Over Non-Sparge | Fold Increase Over Control |
|---|---|---|---|---|---|---|
| Thiobacillus | 5.83 | 25 | 94.00 | 12.8 | 7.34 | 1.12 |
| ferrooxidans | 5.84 | 40 | 127.50 | 76.2 | 1.67 | 2.17 |
| | 7.00 | 25 | 141.69 | 52.3 | 2.70 | 1.17 |
| | 7.00 | 40 | 132.83 | 60.0 | 2.20 | 1.13 |
| Sulfolobus | 4.00 | 25 | 141.67 | 56.1 | 2.53 | 1.17 |
| acidocaldarius | 4.00 | 40 | 144.23 | 136.4 | 1.06 | 2.46 |
| DESA-1 | 7.00 | 25 | 230.63 | 52.3 | 4.41 | 1.89 |
| | 7.00 | 40 | 252.20 | 130.7 | 1.93 | 2.14 |
| None | 4.00 | 25 | 120.90 | 41.6 | 2.91 | — |
| /Control | 4.00 | 40 | 58.60 | 15.9 | 3.69 | — |
| | 5.85 | 25 | 83.20 | 26.0 | 3.20 | — |
| | 5.83 | 40 | 58.70 | 40.6 | 1.45 | — |
| | 7.00 | 25 | 121.40 | 30.0 | 4.05 | — |
| | 7.00 | 40 | 118.00 | 45.4 | 2.60 | — |

Other Common Experimental Conditions
*Atmospheric Pressure
*Studies conducted in triplicate
*Air Sparging at 0.19 SCFM

TABLE E

Comparison of Rates of Regeneration by *Sulfolobus acidocaldarius* DESA-1 under Non-Sparging Conditions

| pH | Temperature °F. (° C.) | DESA-1/TF | DESA-1/Control | TF/Control |
|---|---|---|---|---|
| 5.83 | 77(25) | NA | NA | −0.49 |
| 5.84 | 104(40) | NA | NA | +1.90 |
| 7.00 | 77(25) | +1.00 | +1.75 | +1.75 |
| 7.00 | 104(40) | +2.20 | +2.90 | +1.35 |
| 4.00 | 77(25) | NA | +1.35 | NA |
| 4.00 | 104(40) | NA | +8.60 | NA |

NA-Not Available

The optimal pH's for regenerative action by each bacterium, 4 for *S. Acidocaldarius* DESA-1 and 5.84 for *T. ferrooxidans*, were discovered by the inventors, as detailed in Experiment II above. Experiment III takes into account that accurate comparison of the rates of regeneration of *S. acidocaldarius* DESA-1 and *T. ferrooxidans* requires that the rates at each optimal pH are compared. These pH's are optimal in the sense that regeneration is maximized as a result of optimal growth conditions for the microorganism. The actual rate of regeneration is not necessarily highest at the optimal pH, as seen in Table D where higher rates of regeneration occur with both microorganisms at pH of 7.

The results shown in Table D indicate that under both sparging and non-sparging conditions, the highest rate of regeneration by *S. acidocaldarius* DESA-1 (at pH of 7 and temperature of 40° C.) was about 1.8 fold higher than that obtained by *T. ferrooxidans* (at pH of 7 and temperature of 25° C.). At a pH of 7 and temperature of 40° C., regeneration by *S. acidocaldarius* DESA-1 occurred at about twice the rate as that by *T. ferrooxidans*, both under sparging and nonsparging conditions. These results show that *S. acidocaldarius* DESA-1 has significantly more favorable oxidation kinetics than *T. ferrooxidans*. Additionally, those results show that *S. acidocaldarius* DESA-1 performs better at 40° C. whereas *T. ferrooxidans* performs better at 25° C. The bioregenerating action of *S. acidocaldarius* DESA-1 is facilitated by higher temperatures where the bioregenerating action of the mesophilic Thiobacillus is impeded.

The presentation of the same results in Table E as ratios of the regeneration rates found in Experiment III shows the superior performance of *S. acidocaldarius* DESA-1 even more dramatically. The regeneration rates under nonsparging conditions are of particular interest since the ability to regeneration ARI LO-CAT II® and other catalysts in a substantially anaerobic environment can lead to increased safety and cost savings. As Table E indicates, at a temperature of 40° C., *S. acidocaldarius* DESA-1 regenerates catalyst more than twice as quickly as *T. ferrooxidans*, as the rate of regeneration by *S. acidocaldarius* DESA-1 is more than double. This comparison most directly shows the advantage of a thermophilic microorganism capable of regenerating sulfide mitigation catalyst over *T. ferrooxidans*. In actual industrial practice, sulfide mitigation occurs at higher temperatures, such as from about 40° C. to about 70° C., since the sour natural gas is frequently at those temperatures or higher when entering the reactor. At such temperatures, thermophilic bacteria such as *S. acidocaldarius* DESA-1 will show improved oxidation kinetics over *T. ferrooxidans* and will grow and thrive in the environment to a greater degree.

Furthermore, the results disclosed in Table D show that the rate of regeneration in a sparged sample inoculated with *S. acidocaldarius* DESA-1 was 2.5 times higher than that of an uninoculated sparged sample. Thus, employing *S. acidocaldarius* DESA-1 in traditional aerobic regeneration processes by itself represents a significant improvement in the art of bioregeneration.

Experiment IV

In a separate run of experiments, the rates of regeneration by *T. ferrooxidans* and *S. acidocaldarius* were measured at their respective optimum pH's and at pH's reflecting industrial operating conditions. Experiment IV was performed under essentially the same procedures and steps as Experiment III, although different levels of microbial loading and different amounts of catalyst were used, which accounts for results differing somewhat from those of Experiment III. Experiment IV was performed at atmospheric pressure and at 40° C.

Three flasks for each of the four pH's evaluated were inoculated with one of the microorganisms. These inoculated flasks were not sparged. Uninoculated control flasks were sparged at a rate of 0.19 SCFM to reflect the aeration rates found in the traditional aerobic regeneration process performed in ARI LO-CAT systems. The results of Experiment IV are set forth in Table F.

TABLE F

Effect of pH on the Regeneration Rates of ARI LO-CAT II ® Catalyst at 104° F. (40° C.) by different biocatalysts in comparison to Air Sparging

| | Regeneration Rate, mv/h | | |
| --- | --- | --- | --- |
| pH | Sulfolobus acidocaldarius DESA-1 | Thiobacillus ferrooxidans | Air |
| 4.0 | 18.9 | 0.08 | 8.9 |
| 5.8 | — | 12.2 | 10.5 |
| 7.0 | 7.06 | 10.8 | 11.8 |
| 8.0 | 104.6 | 10.8 | 11.8 |

Experiment IV shows that *Sulfolobus acidocaldarius* DESA-1 regenerated the ARI LO-CAT II® catalyst at a pH of 8 at a much higher rate than either *T. ferrooxidans* or air sparging. In industrial practice, the mitigation of sulfides from sour natural gases occurs at pH's in the range of about 7 to about 8. Accordingly, Experiment IV shows that Sulfolobus regenerates sulfide mitigation catalyst at a much higher rate at the upper end of the operative pH range.

Experiment V

Figure 12:
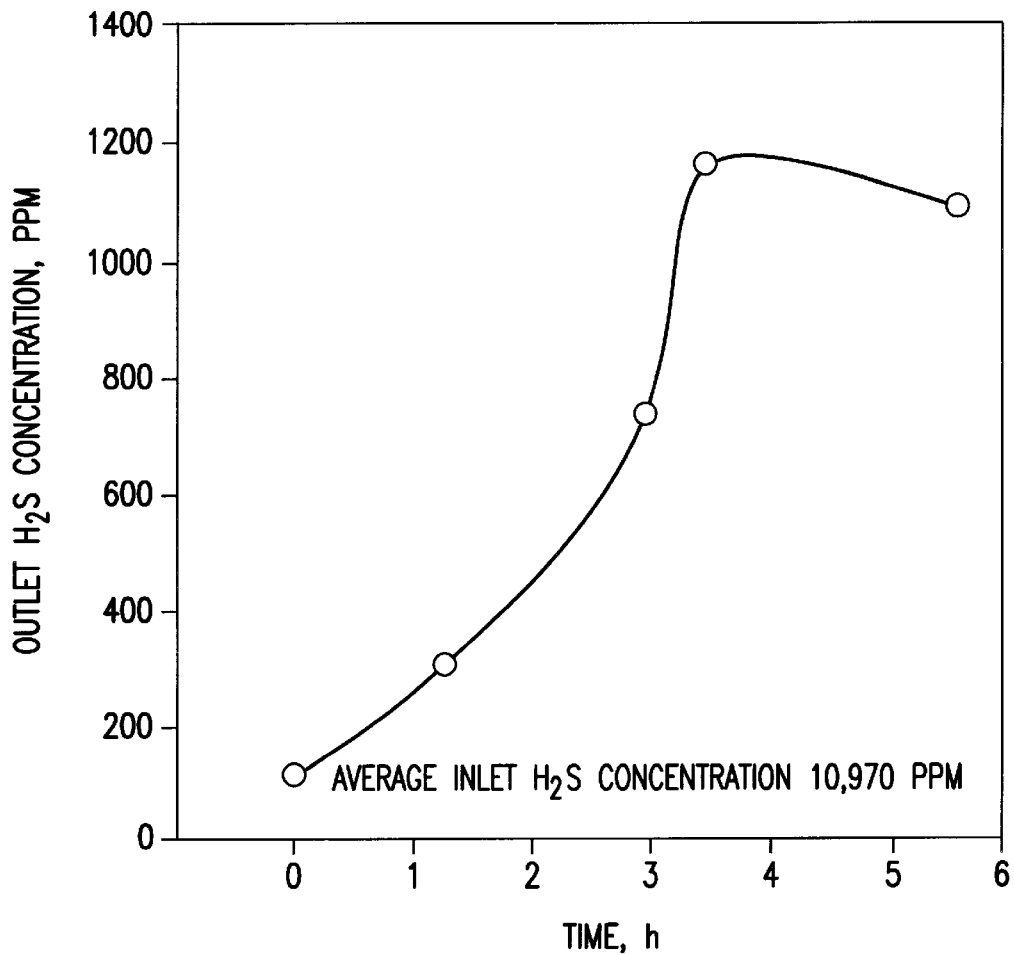
FIG. 12 is a graph showing the removal of hydrogen sulfide by ARI LO-CAT II® catalyst regenerated by *Sulfolobus acidocaldarius* DESA-1.
Figure 13:
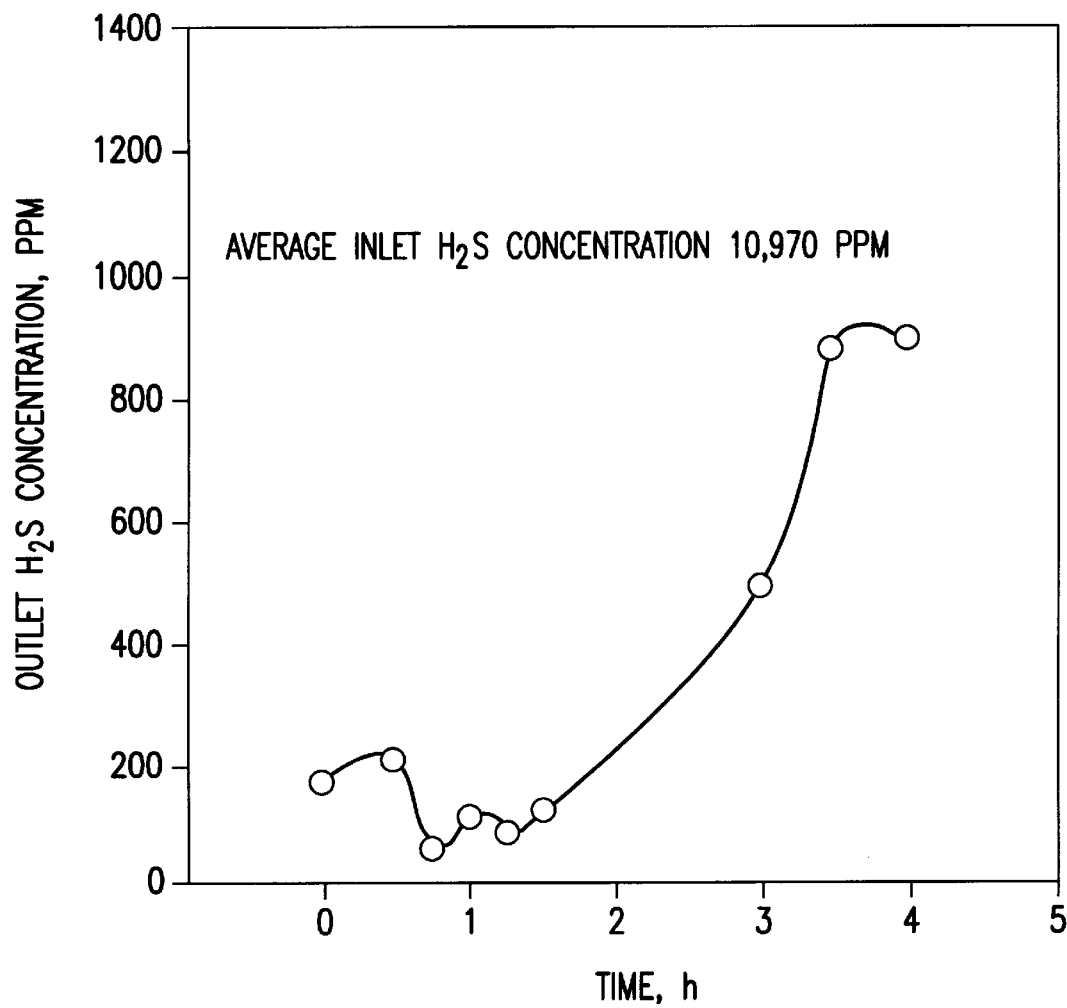
FIG. 13 is a graph showing the removal of hydrogen sulfide by ARI LO-CAT II® catalyst regenerated by *Thiobacillus ferrooxidans*.

Hydrogen sulfide removal by ARI LO-CAT II® catalyst regenerated by *Sulfolobus acidocaldarius* DESA-1 and by *Thiobacillus ferrooxidans* are shown in FIG. 12 and FIG. 13, respectively. In Experiment V, 350 mL of ARI LO-CAT II® catalyst regenerated by *Sulfolobus acidocaldarius* DESA-1 were taken in the BioFlo reactor, such as depicted in FIG. 2. A simulated sour methane gas stream containing 10,000 ppm of $H_2S$ was sparged in at a rate of 1.2 liters per hour. The inlet and outlet hydrogen sulfide gas concentrations were monitored as a function of time. FIG. 12 shows the results of this experiment. The procedure and measurements were repeated with 350 mL of ARI LO-CAT II® catalyst regenerated by *Thiobacillus ferrooxidans*. These results are shown in FIG. 13.

These results demonstrate that the ARI LO-CAT II® catalyst regenerated by each one of the cultures can be used for sweetening of sour natural gas. The catalyst regenerated by *Sulfolobus acidocaldarius* DESA-1 can mitigate sour natural gas as about the same rate as the catalyst regenerated by *Thiobacillus ferrooxidans*, but at a higher temperature and in the pH range of about 7 to about 8. These conditions for regeneration by *S. acidocaldarius* DESA-1 are more suitable to the LO-CAT process than the conditions for *T. ferrooxidans*.

We claim:

1. A process for regenerating a sulfide mitigation catalyst comprising the step of bioregenerating the catalyst by contacting the catalyst with *Sulfolobus acidocaldarius* DESA-1.

2. The process of claim 1 carried out in a substantially anaerobic environment.

3. The process of claim 2 wherein the process occurs in a microaerophilic environment.

* * * * *